United States Patent [19]

Kanai

[11] Patent Number: 4,552,032
[45] Date of Patent: Nov. 12, 1985

[54] SHIFT LEVER DEVICE
[75] Inventor: Takao Kanai, Toyota, Japan
[73] Assignee: Toyota Jidosha Kabushiki Kaisha, Aichi, Japan
[21] Appl. No.: 476,152
[22] Filed: Mar. 17, 1983
[30] Foreign Application Priority Data Dec. 20, 1982 [JP] Japan .............................. 57-192364[U]

[51] Int. Cl.$^4$ ............................................ G05G 9/16
[52] U.S. Cl. ................................ 74/473 R; 74/501 R; 180/89.17; 180/326; 180/336
[58] Field of Search ................. 74/473 R, 501 R; 180/89.13, 89.14, 89.17, 89.18, 326, 327, 328, 336

[56] References Cited

U.S. PATENT DOCUMENTS

| 4,143,560 | 3/1979 | Kinkade et al. | 74/473 R |
| 4,270,403 | 6/1981 | West | 74/501 R X |
| 4,276,953 | 7/1981 | Penzotti et al. | 180/328 |
| 4,312,418 | 1/1982 | Rittman | 180/89.17 X |

Primary Examiner—Allan D. Herrmann
Attorney, Agent, or Firm—Parkhurst & Oliff

[57] ABSTRACT

A shift lever device with a shift lever movable in a shift direction and a select direction for operating a transmission. The movement of the shift lever is imparted through a flexible long means to the transmission.

10 Claims, 2 Drawing Figures

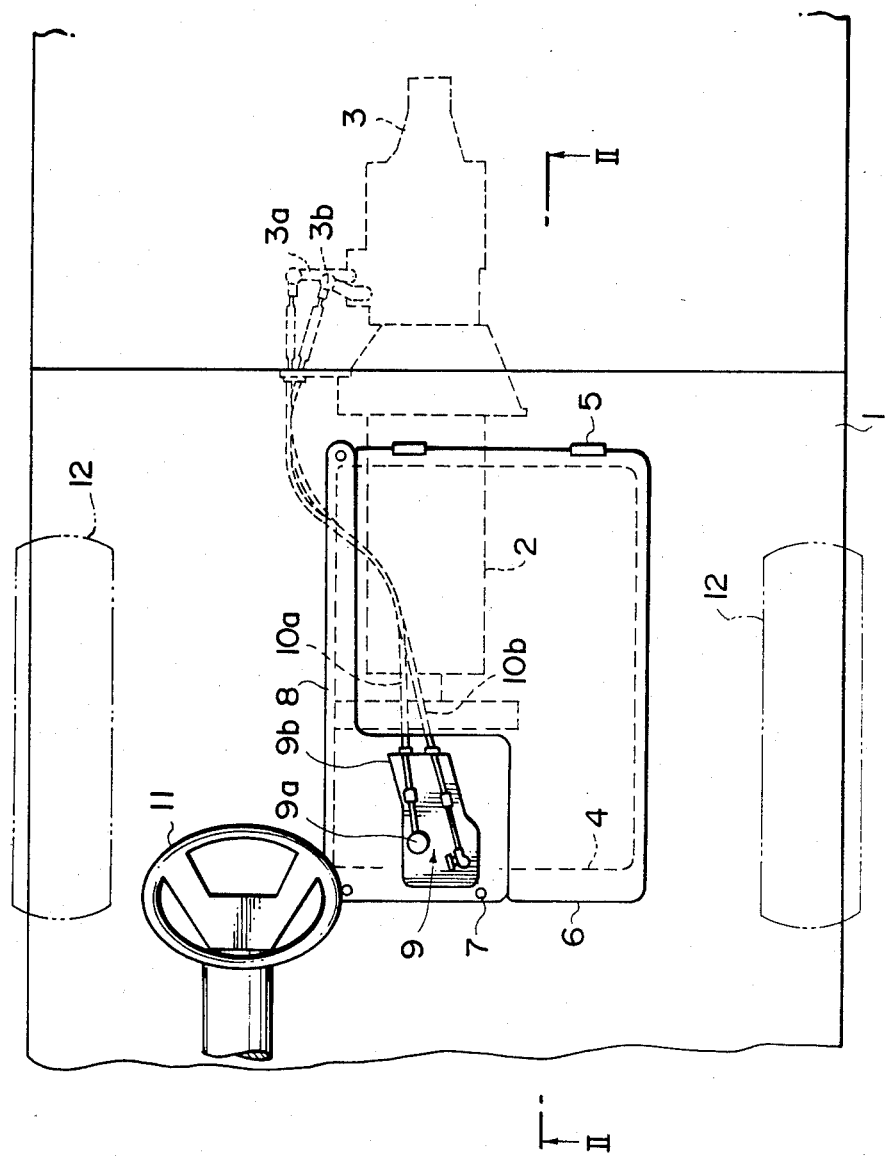

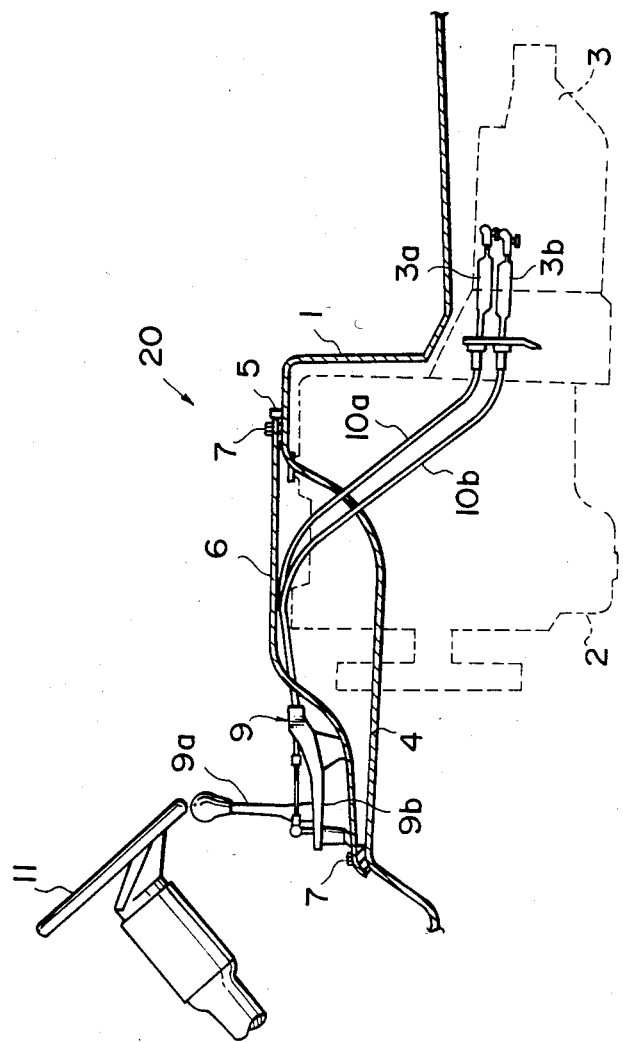

SHIFT LEVER DEVICE

BACKGROUND OF THE INVENTION

1. Field of the Invention

The present invention relates to a shift lever device for a motor vehicle such as a cab-over vehicle whose engine and transmission are positioned under a floor panel which is provided with a service hole for the maintenance or inspection of the engine, and the service hole is covered by a cover.

2. Brief Description of Prior Art

A conventional shift lever device of the above kind includes a shift lever which is moved by a driver in a shift direction, i.e., longitudinal direction of the motor vehicle, and in a select direction, i.e., lateral direction of the motor vehicle. The movement of the shift lever is imparted by a link motion through rods to the transmission. The link motion is secured to a stationary portion of the vehicle's body such as a floor panel or instrument panel, rather than the cover covering the service hole. If the link motion is secured to the cover, the service hole cannot be opened without disconnecting the link motion from the rods. As a result, the shift position of the transmission is unchangeable, when one adjusts or inspects the engine or other components while the engine is driven.

However, the shift lever device is most accesible if it is secured onto the cover covering the service hole, which is usually positioned on one side of and adjacent to the driver's seat.

Therefore, the conventional shift lever device has a disadvantage that the shift lever moves on a operating path not fully available for the driver because of its positioning.

SUMMARY OF THE INVENTION

A principal object of the present invention is to provide a shift lever device of the above kind fully available for a driver preventing the problem that a service hole cannot be opened without disconnecting the shift lever device from the transmission.

According to the present invention a shift lever means with the transmission and the shift lever is secured onto the cover. Therefore, the shift lever is fully available for the driver and the service hole can be opened without disconnecting the shift lever from the transmission.

BRIEF DESCRIPTION OF DRAWINGS

FIG. 1 is a plan view showing one embodiment of the shift lever device for a vehicle according to the present invention in looking from above a cockpit; and FIG. 2 is a sectional view taken along the line II—II in FIG. 1.

DETAILED DESCRIPTION OF A PREFERRED EMBODIMENT

Hereinafter, a preferred embodiment of the present invention is in more detail described referring to the attached drawings. In the embodiment, the present invention is applied to a cab-over motor vehicle.

The vehicle includes a floor panel 1, over which a compartment room 20 is formed and under which various components such as the engine 2, transmission 3 are provided. The floor panel 1 is provided substantially adjacent to a seat 15 with a service hole 4 for the inspection and maintenance of the components. A openable cover 6 is secured to the floor panel 1 through hinges 5 and an auxiliary cover 8 is affixed to the floor panel 1 through screws 7. The service hole 4 formed in the floor panel 1 is covered with these covers 6 and 8.

A link mechanism 9 is solidly secured to the auxiliary cover 8, and a shift lever 9a is connected with the link mechanism 9. The shift lever 9a is movable in a shift direction, i.e., in a longitudinal direction of the vehicle, and in a select direction, i.e., in a lateral direction of the vehicle. The link mechanism 9 converts the movement of the shift lever 9a into a movement of two operating members not shown. One of the operating members moves corresponding to the movement of the shift direction, and the other operating member moves corresponding to the movement of the select direction. The operating members are incorporated within a portion 9b of the link mechanism 9.

The operating member moving in the shift direction is connected with a flexible cable 10a and the other operating member is connected with a flexible cable 10b. The cables 10a and 10b are connected with outer levers 3a and 3b of the transmission 3, respectively. The movement of the shift lever 9a in the shift direction is imparted through the link mechanism 9 and the cable 10a to the transmission 3, and the movement in the select direction is imparted through the link mechanism 9 and the cable 10b to the transmission 3 so that the transmission 3 is changed in its shift position.

The flexible cable 10a and 10b have enough length that the auxiliary cover 8 can be removed to completely open the service hole 4, together with the link mechanism 9 and shift lever 9a, from the floor panel 1 without disconnecting the link mechanism 9 from the transmission 3. Therefore, the transmission 3 is changeable in its shift position even when the inspection or maintenance of the components such as the engine 2 is made. As a result, the serviceability is improved compared with that of the conventional shift lever device.

In the FIGS. 1 and 2, the reference numerals 11 and 12 designate a steering wheel and front wheels, respectively.

In addition, in this embodiment, description has been given of the case where the service hole 4 is covered by the two covers 6 and 8, however, needless to say, such an arrangement may be adopted that the service hole 4 is covered by one cover and the link mechanism 9 including the shift lever 9a may be provided on the cover.

As has been described hereinabove, according to the present invention, the link mechanism including the shift lever is mounted on the cover for the hole for the inspection of the engine, positioned immediately beside the driver's seat, and formed in the floor panel, and the link mechanism and the outer levers for the shift and for the select are connected to each other through the flexible long means, so that the serviceability can be improved with the ideal operating path of the shift lever being obtained.

What is claimed is:

1. A shift lever device for a motor vehicle having an engine and transmission positioned under a floor panel provided with a service hole for maintenance or inspection of said engine, comprising:
   a cover for said service hole allowing access to said transmission and engine;
   a shift lever secured to said cover; and
   a flexible long means connected to said shift lever to operate said transmission, said cover with said shift lever attached thereon being removable without disengaging said shift lever from said cover.

2. A shift lever device as claimed in claim 1, further comprising a link mechanism secured to said cover for operating said transmission.

3. A shift lever device as claimed in claim 1, said flexible long means comprising first and second flexible long members, said first flexible long member imparts movement of said shift lever in a shift direction and said second flexible long member imparts movement of said shift lever in a select direction.

4. A shift lever device as claimed in claim 1, wherein said flexible long means comprises a wire.

5. A shift lever device as claimed in claim 1, wherein said cover is positioned adjacent to a seat for a vehicle driver.

6. A shift lever device for a motor vehicle having an engine and transmission positioned under a floor panel provided with a service hole for maintenance or inspection of said engine, comprising:

a cover for said service hole allowing access to said transmission and engine, said cover comprises a first portion and a second portion;
a shift lever secured to said first portion of said cover; and
a flexible long means connected to said shift lever to operate said transmission, and only said second portion of said cover being removable to allow access to said service hole without disengaging said shift lever from said first portion of said cover.

7. A shift lever device as claimed in claim 6, further comprising a link mechanism secured to said first portion of said cover for operating said transmission.

8. A shift lever device as claimed in claim 6, said flexible long means comprising first and second flexible long members, said first flexible long member imparts movement of said shift lever in a shift direction and said second flexible long member imparts movement of said shift lever in a select direction.

9. A shift lever device as claimed in claim 6, wherein said flexible long means comprises a wire.

10. A shift lever device as claimed in claim 6, wherein said cover is positioned adjacent to a seat for a vehicle driver.

* * * * *